United States Patent
Delplace et al.

(10) Patent No.: US 12,114,037 B2
(45) Date of Patent: Oct. 8, 2024

(54) METHOD AND DEVICE FOR MANAGING THE OPERATING MODE OF A DEVICE COMPRISING MEANS FOR TRANSFERRING AN AUDIOVISUAL SOURCE AND MEANS FOR REPRODUCING AN AUDIO SIGNAL IN AN AUDIOVISUAL SYSTEM

(71) Applicant: SAGEMCOM BROADBAND SAS, Rueil Malmaison (FR)

(72) Inventors: Stéphane Delplace, Rueil Malmaison (FR); Piero Indiveri, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 214 days.

(21) Appl. No.: 17/543,309

(22) Filed: Dec. 6, 2021

(65) Prior Publication Data
US 2022/0201355 A1 Jun. 23, 2022

(30) Foreign Application Priority Data
Dec. 18, 2020 (FR) ...................................... 2013692

(51) Int. Cl.
*H04N 21/4363* (2011.01)
*H04N 21/41* (2011.01)
*H04N 21/45* (2011.01)

(52) U.S. Cl.
CPC ... *H04N 21/43635* (2013.01); *H04N 21/4108* (2013.01); *H04N 21/4518* (2020.08)

(58) Field of Classification Search
CPC ......... H04N 21/43635; H04N 21/4108; H04N 21/4518; H04N 21/436
See application file for complete search history.

(56) References Cited

U.S. PATENT DOCUMENTS

2013/0021536 A1* 1/2013 Kamida ........... H04N 21/43622
348/739
2015/0134860 A1* 5/2015 Lee .................. H04N 21/43635
710/9

(Continued)

FOREIGN PATENT DOCUMENTS

JP 2013-081134 A 5/2013

OTHER PUBLICATIONS

"High-Definition Multimedia Interface Specification Version 2.0," Sep. 4, 2013, XP055388172, Retrieved from the Internet: URL: hdmiforun.org [retrieved online Jul. 5, 2017].

(Continued)

*Primary Examiner* — Brian P Yenke
*Assistant Examiner* — Omer Khalid
(74) *Attorney, Agent, or Firm* — R. Brian Drozd; Williams Mullen

(57) ABSTRACT

A method and a device for managing the operating mode of a device includes transferring an audiovisual source and reproducing an audio signal, the device being connected to a television set of an HDMI connection. A device: attributes to itself an audiovisual source logic address, sends a request for obtaining the version of the HDMI specification of the television set, operates in an adapted operating mode if the version of the HDMI specification implemented by the television set is lower than a version of the HDMI 2.0 specification, attributes to itself an audio system logic address, sends a request for obtaining the version of the HDMI specification of the television set, operates in an operating mode according to the HDMI specification version HDMI 2.0 if the television set has responded to each request, and operates in the adapted operating mode if the television set has not responded to each request.

6 Claims, 5 Drawing Sheets

(56) References Cited

U.S. PATENT DOCUMENTS

| | | | |
|---|---|---|---|
| 2017/0094344 A1* | 3/2017 | Kozuka | H04N 21/4408 |
| 2017/0195722 A1* | 7/2017 | Seo | H04N 21/440218 |
| 2017/0236489 A1* | 8/2017 | Oh | G09G 5/006 |
| | | | 348/727 |
| 2020/0186891 A1* | 6/2020 | Yu | H04N 21/6581 |
| 2021/0144443 A1* | 5/2021 | Joh | H04N 21/84 |
| 2021/0185270 A1* | 6/2021 | Yu | H04N 5/46 |

OTHER PUBLICATIONS

"High-Definition Multimedia Interface. Specification Version 1.4," Internet Citation, Mar. 23, 2020 XP009133650, Retrieved from the Internet: URL: <http://wenku.baidu.com/view/e7db77d184254b35eefd34d0.html> [retrieved online Jun. 16, 2010].
Jun. 17, 2021 Search Report issued in French Patent Application No. 2013692.

* cited by examiner

METHOD AND DEVICE FOR MANAGING THE OPERATING MODE OF A DEVICE COMPRISING MEANS FOR TRANSFERRING AN AUDIOVISUAL SOURCE AND MEANS FOR REPRODUCING AN AUDIO SIGNAL IN AN AUDIOVISUAL SYSTEM

TECHNICAL FIELD

The present invention is in the audiovisual field and more particularly in the field of managing the operating mode of a device comprising means for transferring an audiovisual source and means for reproducing an audio signal.

PRIOR ART

Current domestic audiovisual systems use connections for example in accordance with the HDMI (High Definition Multimedia Interface) specification for connecting the various multimedia devices to a television set.

The multimedia devices are for example audio/video sources such as Blu-ray players, digital television set-top boxes, video game consoles, audio amplifiers, loudspeakers, etc.

Multimedia devices behave with respect to a television set as an audiovisual source or as a destination of an audio signal.

The HDMI specification as from version 2.0 makes it possible to declare a multimedia device both as an audiovisual source and an audio content destination.

These devices thus comprise means for transferring an audiovisual source and means for reproducing an audio signal that may at the same time be a source of an audiovisual signal and reproducing an audio signal.

The HDMI specifications prior to the 2.0 version do not make it possible to declare a multimedia device both as an audiovisual source and as an audio content destination.

In a multimedia system comprising a television set in accordance with an HDMI specification prior to version 2.0, or even for some television sets indicating an implementation of the HDMI specification version 2.0 but not in reality being fully in accordance with this specification, the devices comprising means for transferring an audiovisual source and means for reproducing an audio signal cannot offer all the functionalities that they can provide to the user of the audiovisual system. This is detrimental for the user of the audiovisual system.

DISCLOSURE OF THE INVENTION

For this purpose, according to a first aspect, the invention proposes a method for managing the operating mode of a device comprising means for transferring an audiovisual source and means for reproducing an audio signal, the device comprising the means for transferring an audiovisual source and the means for reproducing an audio signal being connected to a television set by means of a connection of the high definition multimedia interface HDMI type, characterised in that the method comprises the steps performed by the device comprising the means for transferring an audiovisual source and the means for reproducing an audio signal of:
attributing an audiovisual source logic address,
sending a request for obtaining the version of the HDMI specification of the television set,
operating in an adapted operating mode if the version of the HDMI specification implemented by the television set is lower than a version of the HDMI 2.0 specification,
attributing an audio system logic address,
sending a request for obtaining the version of the HDMI specification of the television set,
sending a request for obtaining the version of the HDMI specification of the television set,
operating in an operating mode according to the HDMI specification version HDMI 2.0 if the television set has responded to each request,
operating in the adapted operating mode if the television set has not responded to each request.

The invention thus relates to a device for managing the operating mode of a device comprising means for transferring an audiovisual source and means for reproducing an audio signal, the device comprising the means for transferring an audiovisual source and the means for reproducing an audio signal being connected to a television set by means of a connection of the high definition multimedia interface HDMI type, characterised in that the device comprising the means for transferring an audiovisual source and the means for reproducing an audio signal comprise:
means for attributing an audiovisual source logic address,
means for sending a request for obtaining (E301) the version of the HDMI specification of the television set,
means for operating in an adapted operating mode if the version of the HDMI specification implemented by the television set is lower than a version of the HDMI 2.0 specification,
means for attributing (E305) an audio system logic address,
means for sending a request for obtaining (E306) the version of the HDMI specification of the television set,
means for operating (E310) in an operating mode according to the HDMI specification version HDMI 2.0 if the television set has responded to each request,
means for operating (E303) in the adapted operating mode if the television set has not responded to each request.

Thus the present invention makes it possible to offer to a user each of the operating modes of the device comprising means for transferring an audiovisual source and means for reproducing an audio signal and not penalising a user of the audiovisual system having a television set not in accordance with the HDMI 2.0 specification.

According to a particular embodiment, the adapted operation is an operating mode wherein the device comprising means for transferring an audiovisual source and means for reproducing an audio signal attributes to itself an audiovisual source logic address in place of an audio system logic address for operating in the audiovisual source mode or attributes to itself an audio system logic address in place of an audiovisual source logic address for operating in the audio source mode.

According to a particular embodiment, the attribution of a logic address in place of a logic address in place of another logic address is done on receiving a predetermined message through the HDMI connection. According to a particular embodiment, the attribution of the audio system logic address in place of the audiovisual source address is done solely if no other audio reproduction device is detected.

According to a particular embodiment, when the device comprising the means for transferring an audiovisual source and the means for reproducing an audio signal is in the audiovisual source mode, the device comprising the means for transferring an audiovisual source and the means for reproducing an audio signal transfers solely the video part of the audiovisual signal over the HDMI connection and, through the means for reproducing an audio signal, reproduces the decoded audio component of the audiovisual signal.

According to a particular embodiment, the adapted operation is an operating mode wherein the television set attributes a first physical address to the device comprising means for transferring an audiovisual source and means for reproducing an audio signal, and the device comprising means for transferring an audiovisual source and means for reproducing an audio signal attributes to itself a second physical address.

According to a particular embodiment, when the device comprising the means for transferring an audiovisual source and the means for reproducing an audio signal is in the audiovisual source mode, the device comprising the means for transferring an audiovisual source and the means for reproducing a signal transfers only the visual part of the audiovisual signal over the HDMI connection and, through the means for reproducing an audio signal, reproduces the decoded audio component of the audiovisual signal.

The present invention also relates to a computer program product. It comprises instructions for implementing, by a node device, the method according to one of the preceding embodiments, when said program is executed by a processor of the node device.

The present invention also concerns a storage medium. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
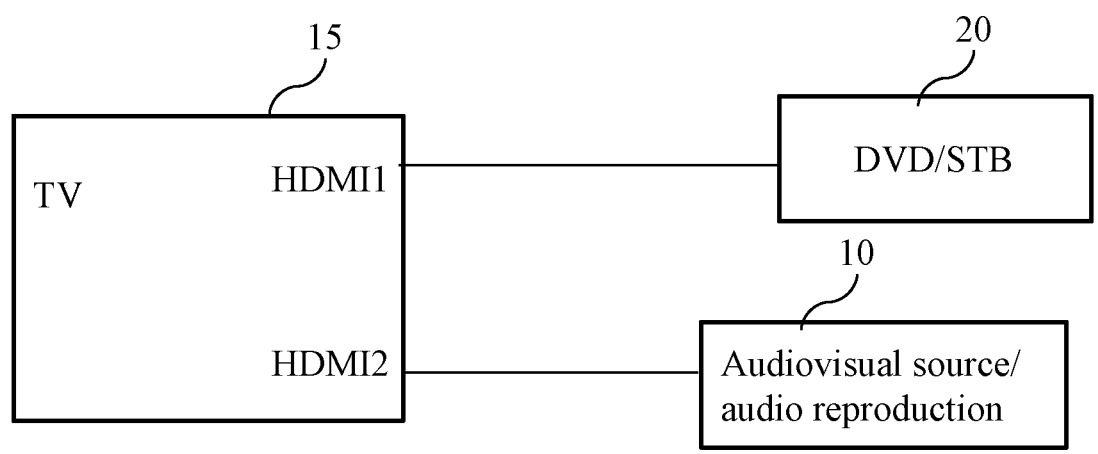
FIG. 1 illustrates schematically an audiovisual signal wherein the present invention is implemented.

FIG. 1 illustrates schematically an audiovisual system wherein the present invention is implemented.

In the example in FIG. 1, a television set 15 is connected to an audiovisual source 20 and to a device 10 comprising means for transferring an audiovisual source and means for reproducing an audio signal by means of HDMI connections.

The audiovisual source 20 is for example a Blu-ray player, a digital television set-top box, or a video game console. The audiovisual source is connected to the television set 15 by an HDMI cable plugged into the HDMI port 1 of the television set 15.

The means for transferring an audiovisual source of the device 10 are for example a Blu-ray player or a digital television set-top box or a video game console and the means for reproducing an audio signal are an amplifier and at least one loudspeaker. The device is connected to the television set 15 by an HDMI cable plugged into the HDMI port 2 of the television set 15.

For reasons of simplification, only two multimedia devices and two HDMI ports are shown in FIG. 1. Naturally the television set 15 comprises a larger number of HDMI ports where other multimedia devices can be connected.

As from the HDMI 2.0 specification, a multimedia device can declare itself both as an audiovisual source and an audio content destination.

For example, the television set 15 attributes the physical address 1.0.0.0 to the audiovisual source 20 connected to the HDMI port 1 and attributes the physical address 2.0.0.0 to the device 10 comprising means for transferring an audiovisual source and means for reproducing an audio signal connected to the HDMI port 2.

The audiovisual source 20 seeks in a list of logic addresses the first logic address corresponding to its type. The audiovisual source 20 attributes to itself a playback system logic address as described at points 11.3.2 and 11.3.3 of the HDMI 2.0 specification, for example the logic address PLAYBACK1.

The device 10 comprising means for transferring an audiovisual source and means for reproducing an audio signal seeks in a list of logic addresses the first logic address corresponding to each of its types. The device 10 comprising means for transferring an audiovisual source and means for reproducing an audio signal attributes to itself the first available playback system logic address, for example the logic address PLAYBACK2 and, if the audio system logic address AUDIOSYSTEM is available, it attributes it to itself, as described at points 11.3.2 and 11.3.3 of the HDMI 2.0 specification.

In a conventional audiovisual system, when a television set is not in accordance with an HDMI specification prior to the version 2.0 or it does not implement all the functionalities of the HDMI version 2.0 specification, a device comprising means for transferring an audiovisual source and means for reproducing an audio signal cannot simultaneously attribute to itself a logic address PLAYBACK and a logic address AUDIOSYSTEM.

Figure 2:
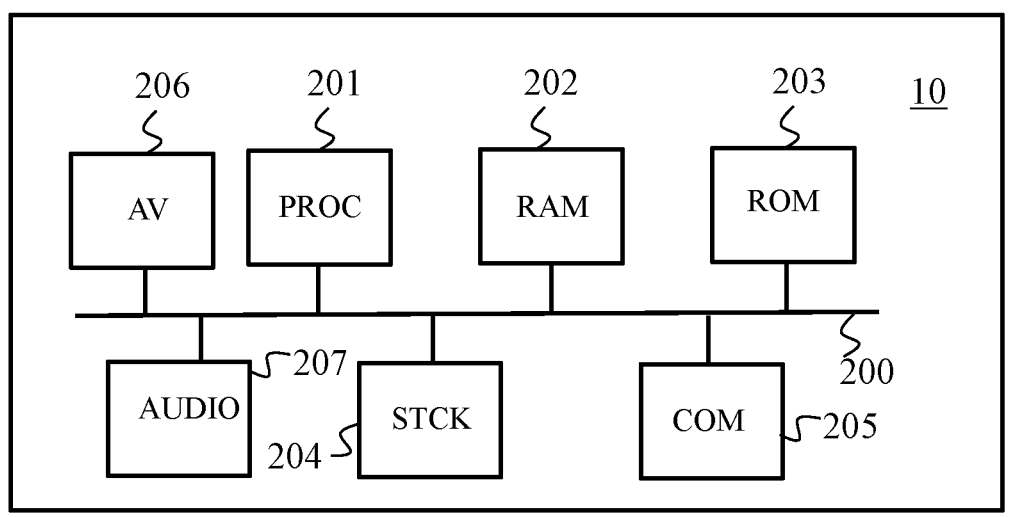
FIG. 2 illustrates schematically an example of hardware architecture of a device comprising means for transferring an audiovisual source and means for reproducing an audio signal.

FIG. 2 illustrates schematically an example of hardware architecture of a device comprising means for transferring an audiovisual source and means for reproducing an audio signal.

According to the example of hardware architecture shown in FIG. 2, the device 10 comprising means for transferring an audiovisual source and means for reproducing an audio signal comprises, connected by a communication bus 200: a processor or CPU (central processing unit) 201; a random access memory RAM 202; a read only memory ROM 203; a storage unit such as a hard disk (or a storage medium reader, such as an SD (Secure Digital) card reader 204; audio reproduction means AUDIO 206 and an audiovisual source AV 206, at least one communication interface 505 enabling the device 10 comprising means for transferring an audiovisual source and means for reproducing an audio signal to communicate by means of at least one HDMI port with the television set 15 or other multimedia devices and to communicate by means of a wide area network, not shown in FIG. 1, when the latter comprises a digital television set-top box.

The processor 201 is capable of executing instructions loaded in the RAM 202 from the ROM 203, from an external memory (not shown), from a storage medium (such as an SD card), or from a communication network. When the device 10 comprising means for transferring an audiovisual source and means for reproducing an audio signal 10 is powered up, the processor 201 is capable of reading instructions from the RAM 202 and executing them. These instructions form a computer program causing the implementation, by the processor 201, of all or part of the method described in relation to FIGS. 3 and 4 or 3 and 5.

The method described below in relation to FIGS. 3 and 4 or 3 and 5 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the device comprises electronic circuitry configured for implementing the method described in relation to FIGS. 3 and 4 or 3 and 5.

Figure 3:
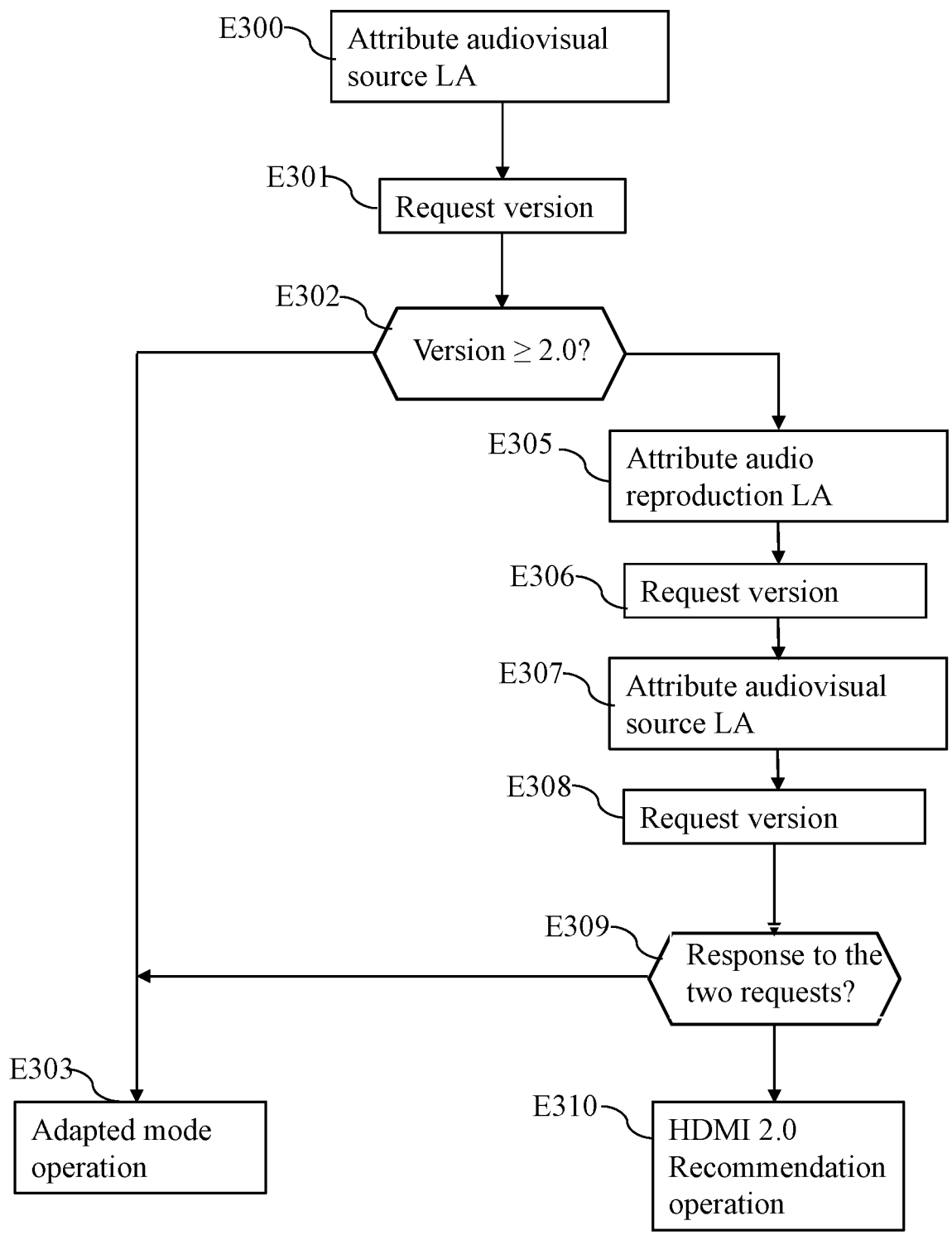
FIG. 3 illustrates schematically a method for managing the operating mode of a device comprising means for transferring an audiovisual source and means for reproducing an audio signal in an audiovisual system comprising a television set adapted or not for managing a device comprising means for transferring an audiovisual source and means for reproducing an audio signal.

FIG. 3 illustrates schematically a method for managing the operating mode of a device comprising means for transferring an audiovisual source and means for reproducing an audio signal in an audiovisual system comprising a television set adapted or not for managing a device comprising means for transferring an audiovisual source and means for reproducing an audio signal.

At the step E300, the device 10 comprising means for transferring an audiovisual source and means for reproducing an audio signal attributes to itself the first playback system logic address available, for example the logic address PLAYBACK2.

At the step E301, the device 10 comprising means for transferring an audiovisual source and means for reproducing an audio signal transfers a version discovery message to the television set 15. This message called "Get CEC Version" is in accordance with the HDMI specification of the version at least equal to version 1.4b.

CEC is the acronym for the English term Consumer Electronic Control.

The version discovery message comprises the logic address PLAYBACK2. At the step E302, the device 10 checks whether the television set 15 is responding to the version request message or is responding to the message indicating a version prior to the version 2.0.

If the television set 15 does not respond to the version request message or responds to the message indicating a version prior to the version 2.0, the device 10 passes to the step E303.

At the step E303, the device 10 goes into an adapted operating mode that will be described in accordance with a first example embodiment with reference to FIG. 4 or in accordance with a second example embodiment with reference to FIG. 5.

If the television set 15 responds to the request message indicating a version equal to or subsequent to the version 2.0, the device 10 passes to the step E305.

At the step E305, the device 10 comprising means for transferring an audiovisual source and means for reproducing an audio signal attributes itself if the audio system logic address AUDIOSYSTEM is available, as described at points 11.3.2 and 11.3.3 of the HDMI 2.0 specification.

If the logic address AUDIOSYSTEM is not available, the device 10 comprising means for transferring an audiovisual source and means for reproducing an audio signal interrupts the present algorithm and:
  deactivates the audio system functionality or
  activates the means for reproducing an audio signal solely for reproducing the decoded audio component of an audiovisual system delivered by the device or
  demands the generation of a message intended for the user notifying the latter that it is impossible to use the means for reproducing an audio signal.

At the step E306, the device 10 transfers to the television set 15 a version discovery message "Get CEC Version" as an audio system. The version discovery message comprises the logic address AUDIOSYSTEM.

At the step E307, the device 10 comprising means for transferring an audiovisual source and means for reproducing an audio signal attributes to itself the first available playback system logic address, for example the logic address PLAYBACK2.

At the step E308, the device 10 transfers to the television set 15 a version discovery message <Get CEC Version> as an audiovisual source. The version discovery message comprises the logic address PLAYBACK2.

At the step E309, the device 10 checks whether the television set is responding to the message sent at the step E306 and to the message sent at the step E308. If so, the device 10 passes to the step E310. If not, the device 10 passes to the step E303.

At the step E310, the device 10, knowing that the television set is able to operate in accordance with the HDMI 2.0 specification, enters a conventional operating mode in accordance with the HDMI specification version 2.0 or more.

Figure 4:
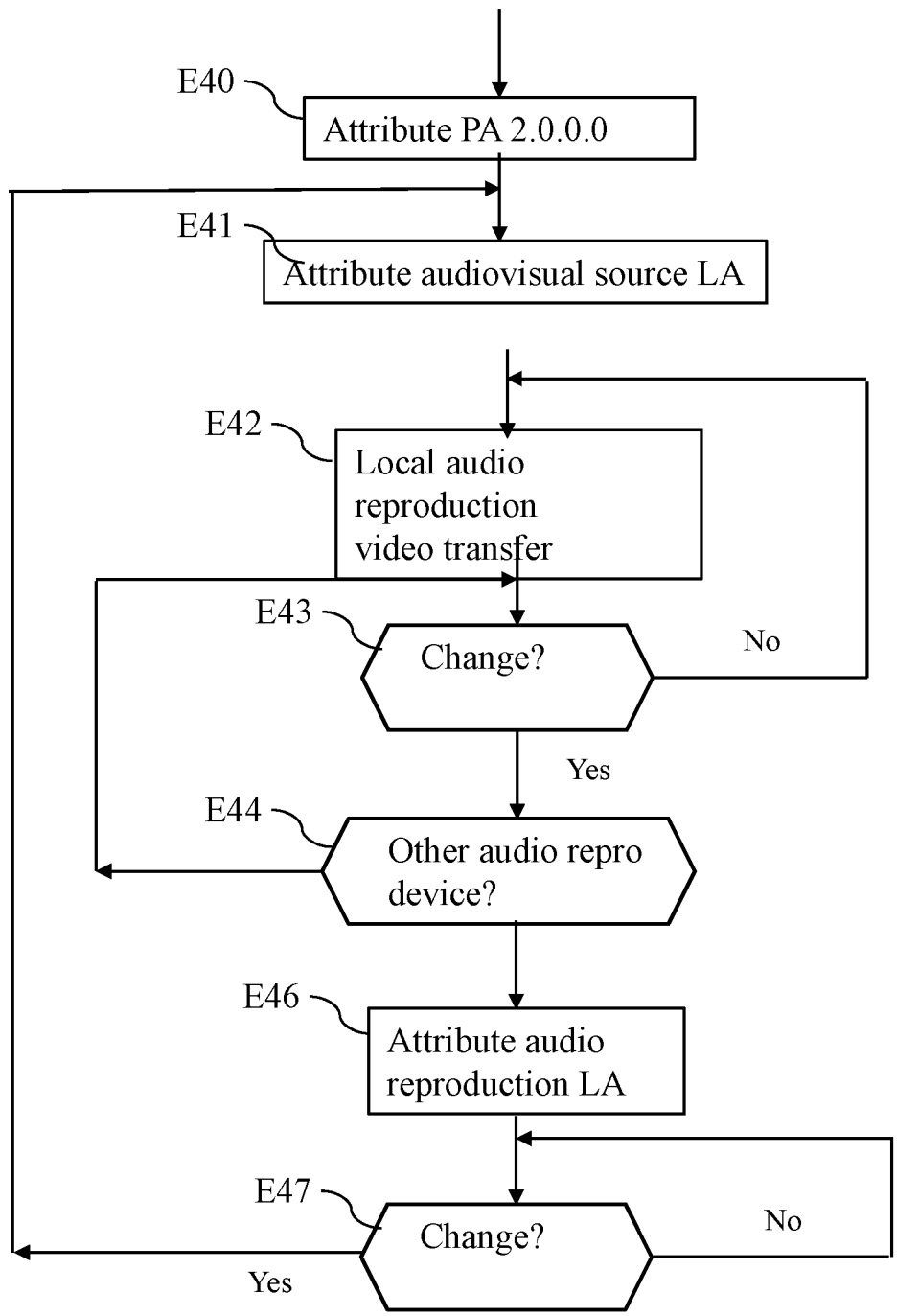
FIG. 4 illustrates schematically a first example embodiment of the method for managing the operating mode of a device comprising means for transferring an audiovisual source and means for reproducing an audio signal in an audiovisual system comprising a television set not adapted for managing a device comprising means for transferring an audiovisual source and means for reproducing an audio signal.

FIG. 4 illustrates schematically a first example embodiment of the method for managing the operating mode of a device comprising means for transferring an audiovisual source and means for reproducing an audio signal in an audiovisual system comprising a television set not adapted to manage a device comprising means for transferring an audiovisual source and means for reproducing an audio signal.

At the step E40, as previously mentioned with reference to FIG. 1, the television set 15 attributes the physical address 1.0.0.0 to the audiovisual source 20 connected to the HDMI 1 port and attributes the physical address 2.0.0.0 to the device 10 comprising means for transferring an audiovisual source and means for reproducing an audio signal connected to the HDMI 2 port.

At the step E41, the device 10 comprising means for transferring an audiovisual source and means for reproducing an audio signal attributes to itself the first playback system logic address available, for example the logic address PLAYBACK2 in place of the audio system logic address LA AUDIOSYSTEM if it had previously attributed it to itself.

At the step E42, the device 10 transfers over the HDMI connection only the video part of the audiovisual signal and locally reproduces, by the means for reproducing an audio signal 207, the decoded audio component of the audiovisual signal.

This is because using the audio return channel (ARC) in this case would cause an unnecessary latency and would especially limit the audio source to ARC compatible formats whereas the means for reproducing an audio signal 207 can support superior audio formats.

At the step E43, the device 10 checks whether there is a switching of the audiovisual source mode to the audio reproduction mode. A switching of the audiovisual source mode to the audio reproduction mode would arise when the HDMI port of the device 10 is no longer the HDMI port used as an audiovisual source of the TV 15. This may for example occur when the user selects, in the interface of the TV 15, an HDMI port other than the one connected to the device 10, or when another device, such as the device 20, connected to the television set 15 is switched on, triggering selection thereof as an audiovisual source. The television set 15 sends, to the periphery connected to the other HDMI port, a CEC message <Set Stream Path>, and this peripheral then broadcasts a CEC message of the <Active Source> type. On receiving this message, the device 10 then determines that it is no longer an audiovisual source. If so, the device 10 passes to the step E44. If not, the device 10 returns to the step E42.

At the step E44 the device 10 comprising means for transferring an audiovisual source and means for reproducing an audio signal checks whether another audio reproduction device is present. The check whether another audio reproduction device is present is made by checking whether the audio system logic address AUDIOSYSTEM is available.

If the logic address AUDIOSYSTEM is not available, the device 10 comprising means for transferring an audiovisual source and means for reproducing an audio signal:
  deactivates the audio system functionality or
  activates the means for reproducing an audio signal solely for reproducing the decoded audio component of an audiovisual signal delivered by the device or
  demands the generation of a message intended for the user notifying the latter that it is impossible to use the means for reproducing an audio signal.

If so, the device 10 returns to the step E43. If not, the device 10 passes to the step E45. At the step E46, the device 10 attributes to itself the audio system logic address LA AUDIOSYSTEM.

At the step E47, the device 10 checks whether there is a switching from the audio reproduction mode to the audiovisual source mode. A switching from the audio reproduction mode to the audiovisual source mode arises when the user selects, as source in the interface of the TV 15, the HDMI port connected to the device 10. The television set 15 transfers a CEC message of the type <Set Stream Path> to the device 10 having the physical address 2.0.0.0, and the device 10 then determines that it must become an audiovisual source.

If the switching to the audiovisual source mode is confirmed, the device 10 returns to the step E41. If not, the device 10 returns to the step E47.

Figure 5:
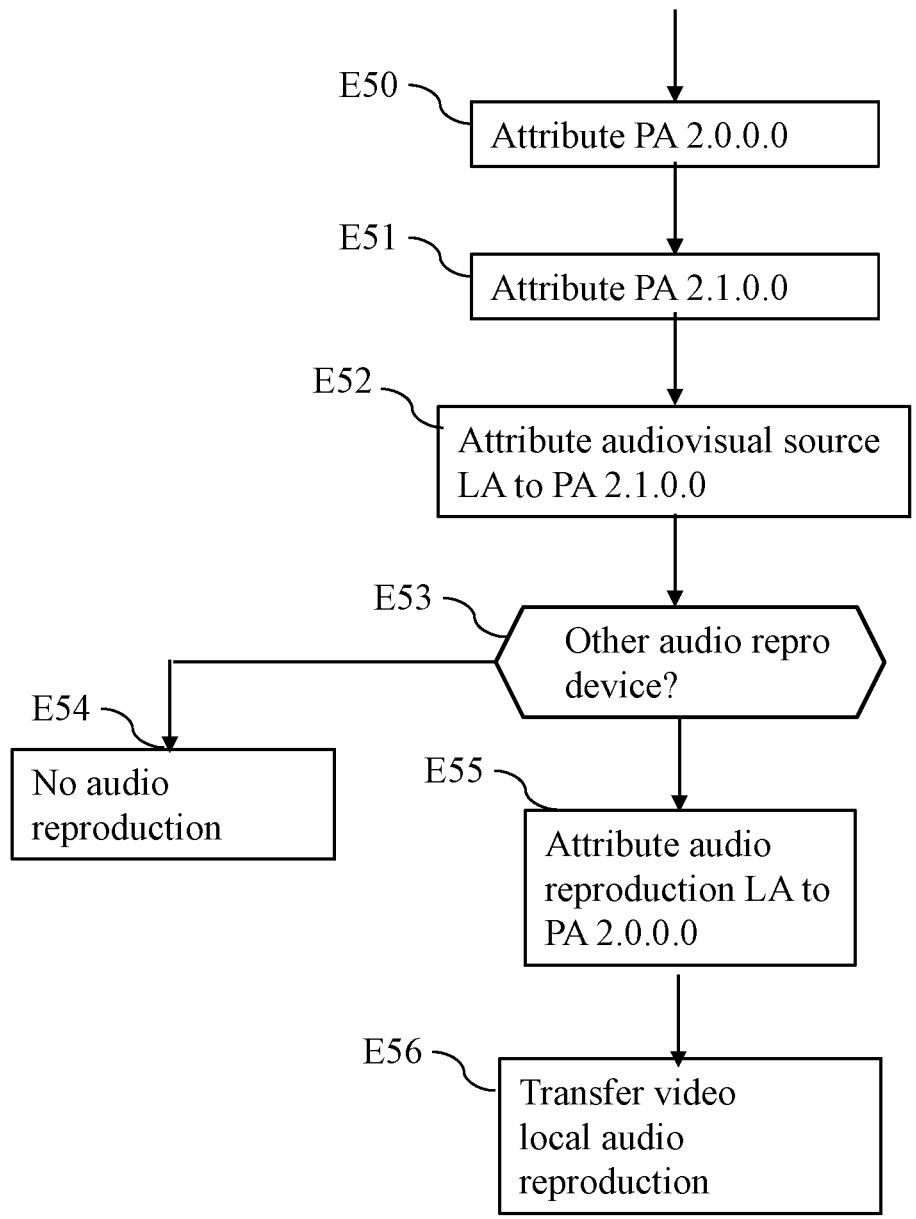
FIG. 5 illustrates schematically a second example of implementing the method for managing the operating mode of a device comprising means for transferring an audiovisual source and means for reproducing an audio signal in an audiovisual system comprising a television set not adapted for managing a device comprising means for transferring an audiovisual source and means for reproducing an audio signal.

FIG. 5 illustrates schematically a second example embodiment of the method for managing the operating mode of a device comprising means for transferring an audiovisual source and means for reproducing an audio signal in an audiovisual system comprising a television set not adapted for managing a device comprising means for transferring an audiovisual source and means for reproducing an audio signal.

As previously mentioned with reference to FIG. 1, the television set 15 attributes the physical address 1.0.0.0 to the audiovisual source 20 connected to the HDMI 1 port and, at the step E50, attributes the physical address 2.0.0.0 to the device 10 comprising means for transferring an audiovisual source and means for reproducing an audio signal connected to the HDMI 2 port.

According to the second example embodiment, at the step E51, the device 10 comprising means for transferring an audiovisual source and means for reproducing an audio signal attributes to itself, in its own physical-address space (2.x.x.x), a second physical address PA 2.1.0.0 as if it were then acting as a repeater according to the HDMI specification.

At the step E52, the device 10 comprising means for transferring an audiovisual source and means for reproducing an audio signal attributes to itself the first playback system logic address available, for example the logic address PLAYBACK2 for the physical address 2.1.0.0.

At the step E53, the device 10 comprising means for transferring an audiovisual source and means for reproducing an audio signal checks whether another audio reproduction device is present. The check whether another audio reproduction device is present is made by checking whether the audio system logic address AUDIOSYSTEM is available.

If the logic address AUDIOSYSTEM is not available, the device 10 comprising means for transferring an audiovisual source and means for reproducing an audio signal passes to the step E54.

At the step E54, the device 10 of comprising means for transferring an audiovisual source and means for reproducing an audio signal:
  deactivates the audio system functionality or
  activates the means for reproducing an audio signal solely for reproducing the decoded audio component of an audiovisual system delivered by the device or
  demands the generation of a message intended for the user notifying the latter that it is impossible to use the means for reproducing an audio signal.

If the logic address AUDIOSYSTEM is available, the device 10 comprising means for transferring an audiovisual source and means for reproducing an audio signal passes to the step E55.

At the step E55, the device 10 comprising means for transferring an audiovisual source and means for reproducing an audio signal attributes to itself the audio system logic address AUDIOSYSTEM for the physical address PA 2.0.0.0, as described at points 11.3.2 and 11.3.3 of the HDMI 2.0 specification.

At the step E56, the device 10 transfers only the video part of the audiovisual signal and locally reproduces, by the means for reproducing an audio signal 207, the decoded audio component of the audiovisual signal.

The invention claimed is:

1. A method for managing the operating mode of a device comprising means for transferring an audiovisual source and means for reproducing an audio signal, the device being connected to a television set by means of a connection of the high definition multimedia interface HDMI type, wherein said method causes the device to perform:
  attributing an audiovisual source logic address, sending a first request comprising the audiovisual source logic address attributed for obtaining a version of the HDMI specification of the television set, attributing an audio system logic address, sending a second request comprising the audio system logic address attributed for obtaining the version of the HDMI specification of the television set, attributing an audiovisual source logic address, sending a third request comprising the audiovisual source logic address attributed for obtaining the version of the HDMI specification of the television set, determining that the television set has responded to each one of the second and third requests;

determining that the television set is able to operate in accordance with the HDMI 2.0 specification and entering an operating mode in accordance with the HDMI 2.0 or higher specification based on the determination that the television set has responded to each one of the second and third requests.

2. The method according to claim 1, wherein the attribution of a logic address in place of another logic address is done on receiving a predetermined message through the HDMI connection.

3. The method according to claim 1, wherein the attribution of the audio system logic address in place of the audiovisual source address is done solely if no other audio reproduction device is detected.

4. The method according to claim 1, wherein, when the device is in an audiovisual source mode, the device transfers only the video part of the audiovisual signal over the HDMI connection, and reproduces, via the means for reproducing an audio signal, the decoded audio component of the audiovisual signal.

5. A device for managing the operating mode of a device comprising means for transferring an audiovisual source and means for reproducing an audio signal, the device being connected to a television set by means of a connection of the high definition multimedia interface HDMI type wherein the device comprises circuitry causing the device to perform:

attributing an audiovisual source logic address, sending a first request comprising the audiovisual source logic address attributed for obtaining a version of the HDMI specification of the television set, operating in an adapted operating mode if the version of the HDMI specification implemented by the television set is lower than a version of the HDMI 2.0 specification, and if the television set responds to the request message by indicating a version equal to or subsequent to the version of the HDMI 2.0 specification, activating attributing an audio system logic address, sending a second request comprising the audio system logic address attributed for obtaining the version of the HDMI specification of the television set, attributing an audio system logic address, sending a third request comprising the audiovisual source logic address attributed for obtaining the version of the HDMI specification of the television set, determining that the television set is able to operate in accordance with the HDMI 2.0 specification and entering an operating mode in accordance with the HDMI 2.0 or higher specification if the television set has responded to each of the second and third requests, operating in the adapted operating mode if the television set has not responded to each of the second and third requests, the adapted operation mode being:

either an operating mode in which the device attributes to itself an audiovisual source logic address in place of an audio system logic address for operating in an audiovisual source mode or attributes to itself an audio system logic address in place of an audiovisual source logic address for operating in the audio source mode, or an operating mode in which the television set attributes a first physical address to the device and the device attributes to itself a second physical address.

6. A non-transitory storage medium that stores a computer program comprising instructions for implementing, by a node device, the method according to claim 1, when said program is executed by a processor of the node device.

* * * * *